US010112346B2

(12) United States Patent
Wu (10) Patent No.: US 10,112,346 B2
(45) Date of Patent: Oct. 30, 2018

(54) PRINTING METHOD FOR LOW MELTING-POINT MATERIAL OF 3D PRINTER

(71) Applicants: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

(72) Inventor: Bo-Yi Wu, New Taipei (TW)

(73) Assignees: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

( * ) Notice: Subject to any disclaimer, the term of this patent is extended or adjusted under 35 U.S.C. 154(b) by 294 days.

(21) Appl. No.: 14/809,914

(22) Filed: Jul. 27, 2015

(65) Prior Publication Data

US 2016/0361875 A1    Dec. 15, 2016

(30) Foreign Application Priority Data

Jun. 15, 2015    (CN) .......................... 2015 1 0328979

(51) Int. Cl.
*B29C 64/209*    (2017.01)
*B33Y 10/00*    (2015.01)
(Continued)

(52) U.S. Cl.
CPC ........ *B29C 67/0088* (2013.01); *B29C 64/106* (2017.08); *B29C 64/118* (2017.08);
(Continued)

(58) Field of Classification Search
CPC ... B29C 64/106; B29C 64/112; B29C 64/118; B29C 64/124; B29C 67/0055; B29C 67/0059; B29C 67/0088
See application file for complete search history.

(56) References Cited

U.S. PATENT DOCUMENTS 9,011,136 B1    4/2015    Uzan et al.
2014/0291893 A1*    10/2014    Hopkins ................ B33Y 50/02
                                                                      264/308
2015/0147421 A1    5/2015    Te et al.

OTHER PUBLICATIONS

Kalani Kirk Hausman et al: "3D printing for dummies" Jan. 8, 2014, Wiley, XP055314772, ISBN: 978-1-118-66075-5, pp. 33; Figs. 2-12.

(Continued)

*Primary Examiner* — Jeffrey M Wollschlager
*Assistant Examiner* — Armand Melendez
(74) *Attorney, Agent, or Firm* — Chun-Ming Shih; HDLS IPR Services (57) ABSTRACT

A printing method using a low melting-point material is disclosed. The method first controls a nozzle of a 3D printer to move to a position corresponding to an internal-contour of a 3D model for printing the internal-contour upon a printing platform, then controls the nozzle to move to other position corresponding to an exterior-contour of the 3D model for printing the exterior-contour. After completing the exterior-contour, the method controls the nozzle to move inwardly to leave away from the exterior-contour, and then changes a related position between the nozzle and the printing platform upon z-axis for a next printing-layer. The method prevents a drooling event of the low melting-point material occurs at the exterior-contour and destroys an appearance of the 3D model.

12 Claims, 7 Drawing Sheets

(51) Int. Cl.
    *B29C 64/106*     (2017.01)
    *B29C 67/00*     (2017.01)
    *B29C 64/386*     (2017.01)
    *B29C 64/245*     (2017.01)
    *B29C 64/118*     (2017.01)
    *B33Y 50/02*     (2015.01)
    *B29K 67/00*     (2006.01)

(52) U.S. Cl.
    CPC .......... *B29C 64/209* (2017.08); *B29C 64/245* (2017.08); *B29C 64/386* (2017.08); *B29K 2067/046* (2013.01); *B33Y 10/00* (2014.12); *B33Y 50/02* (2014.12)

(56) References Cited

OTHER PUBLICATIONS

Search Report dated Nov. 11, 2016 of the corresponding European patent application.

\* cited by examiner

PRINTING METHOD FOR LOW MELTING-POINT MATERIAL OF 3D PRINTER

BACKGROUND OF THE INVENTION

1. Technical Field

The technical field relates to a printing method of a 3D printer, and specifically to a printing method for low melting-point material of a 3D printer.

2. Description of prior art

Recently, 3D printing technology develops very quick, and the price of a 3D printer becomes cheaper and cheaper. As a result, 3D models made by 3D printing technology are gradually popular around people.

Generally speaking, 3D printing technology in the related art usually adopts acrylonitrile-butadiene-styrene (ABS) resin as printing material. However, ABS resin will release poisonous gas during a printing procedure, and it does not smell good. As such, there are some new type 3D printers in the market adopt poly lactic acid (PLA) as the printing material. Comparing with ABS resin, PLA is environmental protection material made by corn, so it can decompose naturally, and it won't generate stink smell and release poisonous gas during the printing procedure.

Figure 1:
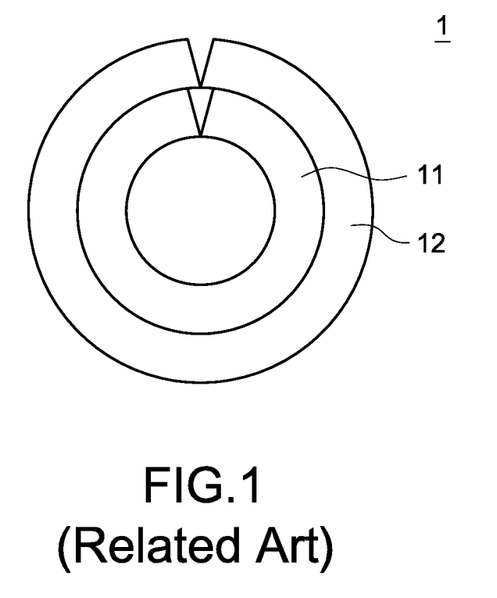
FIG. 1 is a schematic diagram of a model of related art.
Figure 2:
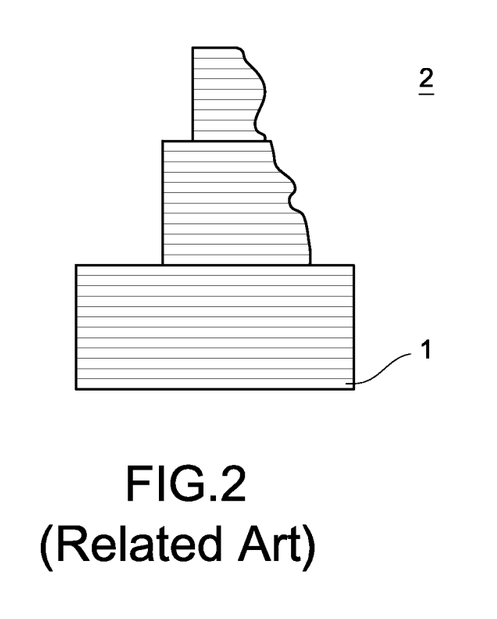
FIG. 2 is a schematic diagram of a finished model of related art.

Refers to FIG. 1 and FIG. 2, FIG. 1 is a schematic diagram of a model of related art, and FIG. 2 is a schematic diagram of a finished model of related art. Because the melting-point of PLA is low and PLA is soft, when printing a 3D model 2 by using PLA as the printing material, an ordinary 3D printer usually prints two layers of contour (basically an internal-contour 11 and an exterior-contour 12) of the 3D model 2. Therefore, the 3D printer can make sure that the finished 3D model 2 is strong enough.

A nozzle of the 3D printer is heated continually during the printing procedure, and PLA material won't be solidified immediately after being printed. As such, if the 3D printer prints the exterior-contour 12 at first and then prints the internal-contour 11 during the printing procedure, the finished exterior-contour 12 will receive heat from the nozzle continually when the 3D printer prints the internal-contour 11, and the exterior-contour 12 may be deformed because of the heat.

According to above descriptions, the 3D printer in the related art usually prints the internal-contour 11 at first and then prints the exterior-contour 12. Therefore, although the finished internal-contour 11 may be deformed when the 3D printer prints the exterior-contour 12, but it does not matter because the deformed internal-contour 11 does not affect an appearance of the finished 3D model 2.

Generally, the 3D model 2 is constructed by multiple printing-layers 1. The 3D printer first prints one of the printing-layers 1, then raises the nozzle to a printing position corresponding to the next printing-layer 1 (i.e., raising the nozzle to above the finished printing-layer 1) for printing the next printing-layer 1 thereof.

However, if the nozzle is raised directly from the finished exterior-contour 12, it still located in proximity of the finished exterior-contour 12. Therefore, the finished exterior-contour 12 may still be deformed by the heat of the nozzle if the nozzle stays in proximity of the finished exterior-contour 12 for excessively long time.

Besides, the melting-point of PLA is low, so drooling events may occur in the nozzle of the 3D printer adopting PLA. If the nozzle is raised directly from the finished exterior-contour 12, the drooling events may occur at the finished exterior-contour 12. Therefore, the finished exterior-contour 12 may be deformed by the heat of the drooled material.

SUMMARY OF THE INVENTION

The disclosure is directed to a printing method for low melting-point material of 3D printer, which can avoid drooling events of the low melting-point material to affect an appearance of a finished 3D model during a printing procedure.

In one of the exemplary embodiments, the printing method first controls a nozzle of the 3D printer to move to a position corresponding to an internal-contour of the 3D model for printing the internal-contour upon a printing platform, then controls the nozzle to move to other position corresponding to an exterior-contour of the 3D model for printing the exterior-contour. After completing the exterior-contour, the method controls the nozzle to move inwardly to leave away from the exterior-contour, and then changes a related position between the nozzle and the printing platform upon z-axis for printing next printing-layer.

Comparing with the related art, this disclosure prevents the drooling event occurs at the exterior-contour of each printing-layer by controlling the position of the nozzle. Therefore, the appearance of the finished 3D model will not be affected by the drooling event.

DETAILED DESCRIPTION OF THE INVENTION

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

In one embodiment of this invention discloses a printing method for low melting-point material of a 3D printer (refers to as the printing method hereinafter). The printing method is used by the 3D printer which adopts low melting-point material, for example, poly lactic acid (PLA), for printing, and the printing method is to solve problems that the low melting-point material is easily deformed when receiving heat during a printing procedure, and a drooling event may occur when the 3D printer moves a nozzle thereof.

Figure 3:
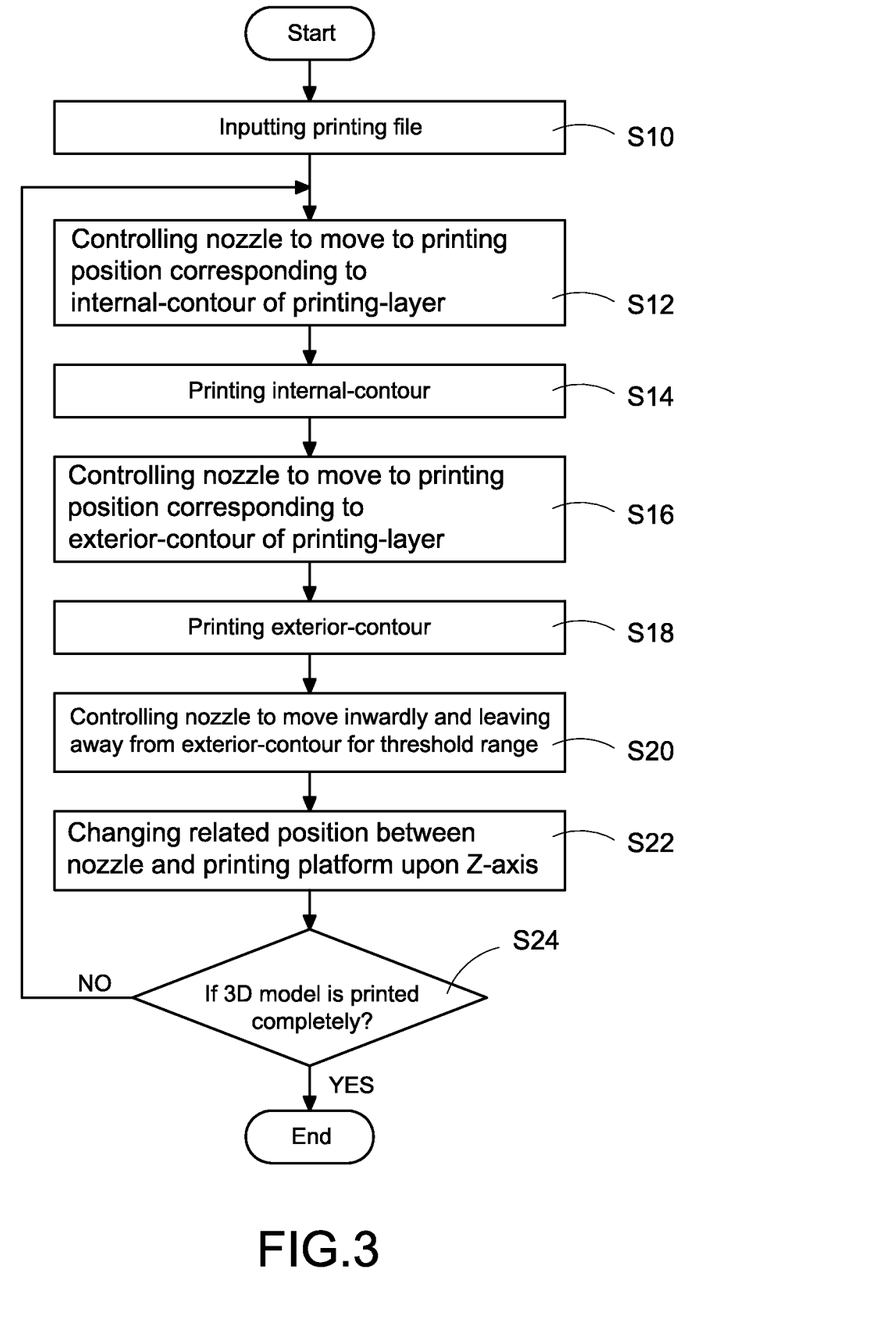
FIG. 3 is a printing flowchart of an embodiment according to the present disclosure.

FIG. 3 is a printing flowchart of an embodiment according to the present disclosure. Firstly, a 3D printer (not shown) is inputted with a printing file (step S10), wherein the printing file is corresponding to a 3D model a user wants to print. In this embodiment, the 3D model is constructed by multiple printing-layers (such as a printing-layer 4 shown in FIG. 4A). The 3D printer first executes a slice process after the printing file is inputted for generating a plurality of printing-layer data corresponding to the multiple printing-layers 4. The 3D printer then prints the multiple printing-layers 4 in order based on the plurality of printing-layer data, and constructs the 3D model by the multiple finished printing-layers 4. For easily understanding, the following embodiments in this disclosure will take the 3D printer to print a single printing-layer 4 for instance, but not limited thereto.

The printing method of an embodiment is used by the 3D printer which adopts PLA material. As a result, the 3D printer needs to print an internal-contour and an exterior-contour (such as an internal-contour 41 and an exterior-contour 42 shown in FIG. 4D) when printing a contour of the printing-layer 4, so as to enhance the strength of the 3D model.

In this embodiment, the 3D printer first generates the printing-layer data, and constitutes the exterior-contour 42 according to a plurality of periphery coordinates of the printing-layer data. Then, the 3D printer executes a displacement calculation via an internal algorithm, so as to generate a plurality of coordinates at inner positions of the exterior-contour 42 for constituting the internal-contour 41. In other words, the internal-contour 41 is not directly included in the inputted printing file, it is generated dynamically by the 3D printer according to the plurality of periphery coordinates of the exterior-contour 42.

After the step S10, the 3D printer controls a nozzle (such as a nozzle 3 shown in FIG. 4A) to move to a printing position upon a printing platform (such as a printing platform 31 shown in FIG. 4E) corresponding to the internal-contour 41 of the printing-layer 4 (step S12). Then, the 3D printer controls the nozzle 3 to feed material, so as to print the internal-contour 41 upon the printing platform 31 according to the plurality of coordinates of the internal-contour 41 (step S14).

After completing the internal-contour 41, the 3D printer controls the nozzle 3 to move to other printing position upon the printing platform 31 corresponding to the exterior-contour 42 of the same printing-layer 4 (step S16), and controls the nozzle 3 to feed material, so as to print the exterior-contour 42 upon the printing platform 31 according to the plurality of periphery coordinates of the exterior-contour 42 (step S18).

To prevent the exterior-contour 42 from deforming by the temperature of the nozzle 3, the 3D printer in this embodiment controls the nozzle 3 to move inwardly to leave away from the exterior-contour 42 for a threshold range immediately after the exterior-contour 42 is finished (step S20). Besides, the 3D printer further controls the nozzle 3, after the nozzle 3 is away from the exterior-contour 42 for the threshold range, to change a related position between the nozzle 3 and the printing platform 31 upon a Z-axis (step S22), for printing the next printing-layer 4.

Specifically, when printing the internal-contour 41 and the exterior-contour 42, the 3D printer mainly controls the nozzle 3 to move according to an X-axis and a Y-axis. When starting to print the next printing-layer 4, the 3D printer first needs to control the nozzle 3 or the printing platform 31 to move according to the Z-axis (for example, controls the nozzle 3 to rise or controls the printing platform 31 to descend), so as to place the nozzle 3 to a certain printing height corresponding to the next printing-layer 4.

The threshold range mentioned above is a safety range to prevent the exterior-contour 42 from being affected by the temperature of the nozzle 3. Further, PLA material is soft and it has low melting-point, so drooling events may occur in the nozzle 3 which feeds the PLA material. As such, for preventing the drooling events of PLA material from occurring at the exterior-contour 42 and affecting the appearance of the 3D model when raising the nozzle 3, the 3D printer in this embodiment, first controls the nozzle 3 to move inwardly from the exterior-contour 42 to a position free from affectting the exterior-contour 42, and then controls the nozzle 3 or the printing platform 31 to move according to the Z-axis (i.e., changes the height of the nozzle 3 or the printing platform 31 at the Z-axis).

As mentioned above, even the drooling events occur in the nozzle 3, but the PLA material will be drooled inside the whole 3D model in this embodiment, so the appearance of the 3D model is not affected by the drooling events.

After the step S22, the 3D printer determines if the 3D model is printed completely (step S24). More specifically, the 3D printer determines if all printing-layers 4 included in the printing file are printed completely or not. If the 3D printer determines that the 3D model is not completed yet, the step S12 to the step S22 are re-executed for printing the next printing-layer 4. It should be mentioned that if the 3D model is not completed yet, the 3D printer in the step S22 changes the height of the nozzle 3 or the printing platform 31 at the Z-axis, so as to place the nozzle 3 to the printing position corresponding to the next printing-layer 4. More particularly, the 3D printer in the step S22 is to place the nozzle 3 to the printing position corresponding to the internal-contour 41 of the next printing-layer 4, but not limited thereto.

Otherwise, if the 3D printer determines the 3D model is printed completely, it can terminate the printing action.

Please refer to FIG. 4A to FIG. 4G, which are schematic diagrams of a first printing action to a seventh printing action of embodiments according to the present disclosure.

Figure 4A:
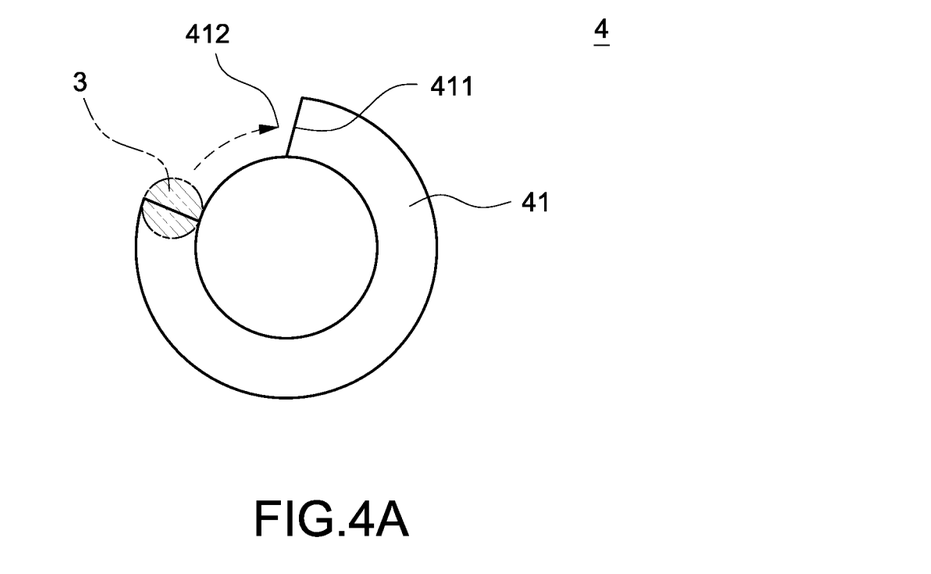
FIG. 4A is a schematic diagram of a first printing action of an embodiment according to the present disclosure.

As shown in FIG. 4A, when printing one of the multiple printing-layers 4 of the 3D model, the 3D printer first controls the nozzle 3 to move to a first starting position 411 upon the printing platform 31 corresponding to the internal-contour 41 of the printing-layer 4, and starts to print the internal-contour 41 from the first starting position 411. Particularly, the nozzle 3 of the 3D printer is controlled to move and feed material according to the plurality of coordinates of the internal-contour 41 from the first starting position 411, and the printing action for printing the internal-contour 41 is completed when the nozzle 3 moves to a first ending position 412 of the internal-contour 41.

Figure 4B:
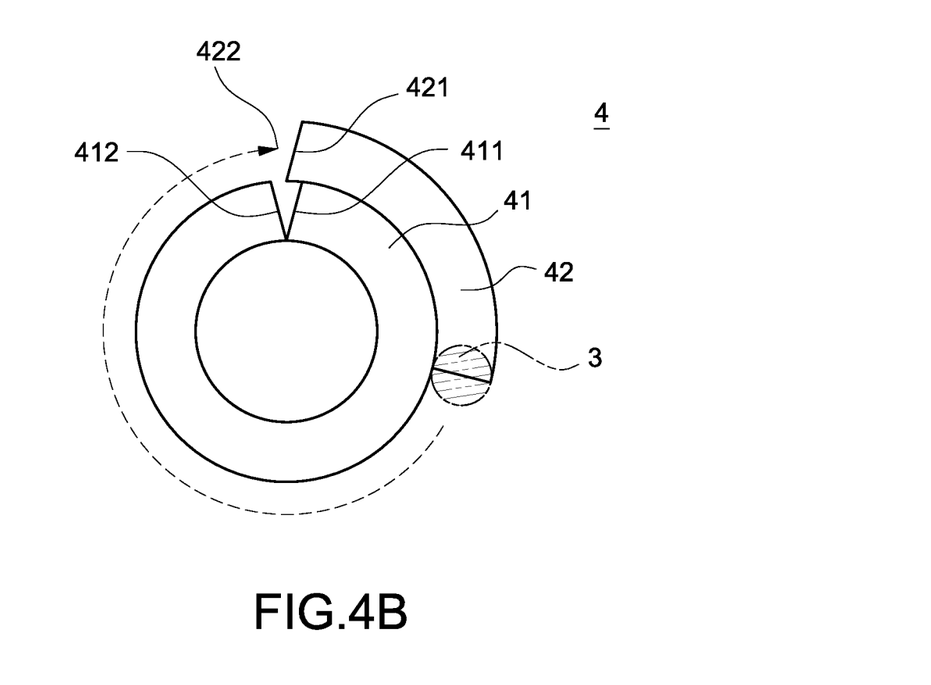
FIG. 4B is a schematic diagram of a second printing action of an embodiment according to the present disclosure.
Figure 4C:
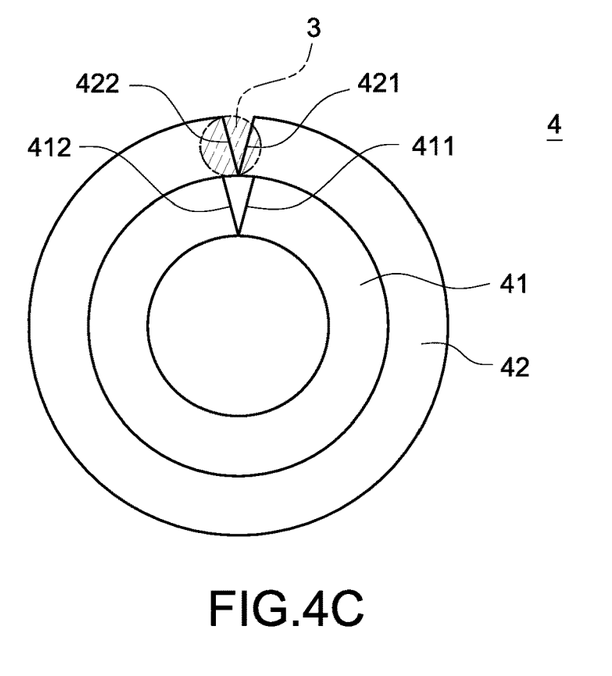
FIG. 4C is a schematic diagram of a third printing action of an embodiment according to the present disclosure.
Figure 4D:
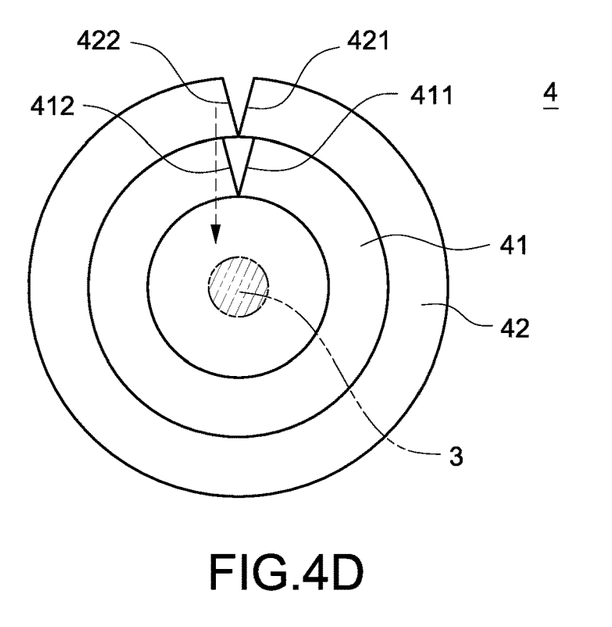
FIG. 4D is a schematic diagram of a fourth printing action of an embodiment according to the present disclosure.
Figure 4E:
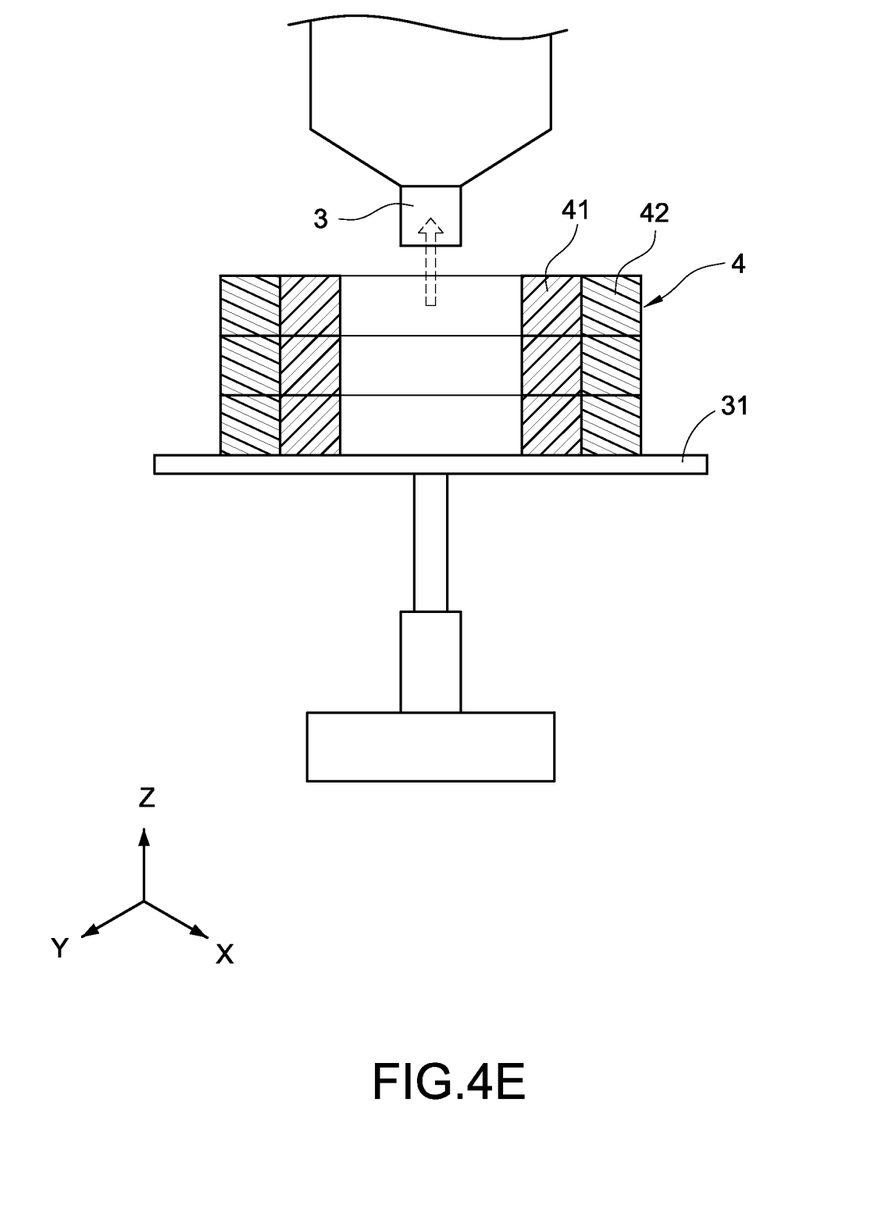
FIG. 4E is a schematic diagram of a fifth printing action of an embodiment according to the present disclosure.

As shown in FIG. 4B and FIG. 4C, when the internal-contour 41 is printed completely, the 3D printer controls the nozzle 3 to move from the first ending position 412 of the internal-contour 41 to a second starting position 421 upon the printing platform 31 corresponding to the exterior-contour 42 of the same printing-layer 4. Then, the 3D printer further controls the nozzle 3 to print the exterior-contour 42 from the second starting position 421. As mentioned above, the nozzle 3 of the 3D printer is controlled to move and feed material according to the plurality of periphery coordinates of the exterior-contour 42 from the second starting position 421, and the printing action for printing the exterior-contour 42 is completed when the nozzle 3 moves to a second ending position 422 of the exterior-contour 42.

As shown in FIG. 4D, after printing the exterior-contour 42 completely, the 3D printer in this embodiment does not directly and immediately control the nozzle 3 to raise to the printing position of the next printing-layer 4. For reaching the purposes that prevents the exterior-contour 42 being deformed by the temperature of the nozzle 3, and prevents the drooling events occur at the exterior-contour 42, the 3D printer in this embodiment controls the nozzle 3 to move from the second ending position 422 to an internal position of the whole 3D model and leave the exterior-contour 42 for the threshold range immediately after the exterior-contour 42 is printed completely.

It should be mentioned that the 3D printer in one of the exemplary embodiments, controls the nozzle 3 to move inwardly from the exterior-contour 42 to the inter-contour 41 immediately after the exterior-contour 42 is printed completely, so as to reach the above mentioned purpose. In particularly, the 3D printer controls the nozzle 3 to move inwardly from the second ending position 422 of the exterior-contour 42 to any position of the internal-contour 41 in this embodiment, but not limited thereto.

In other embodiment, the 3D printer can control the nozzle 3 to move inwardly from the exterior-contour 42 to a center position of the 3D model (such as a center position shown in FIG. 4D) immediately after the exterior-contour 42 is printed completely, so as to reach the above mentioned purpose.

In another embodiment, the 3D printer can also control the nozzle 3 to move inwardly from the exterior-contour 42 to a position which does not exist the low melting-point material immediately after the exterior-contour 42 is printed completely, so as to reach the above mentioned purpose. It should be mentioned that for making the 3D model to have a certain strength, the 3D printer usually prints a basic structure for the 3D model inside the internal-contour 41 and the exterior-contour 42, so the finished 3D model won't be empty.

Figure 4F:
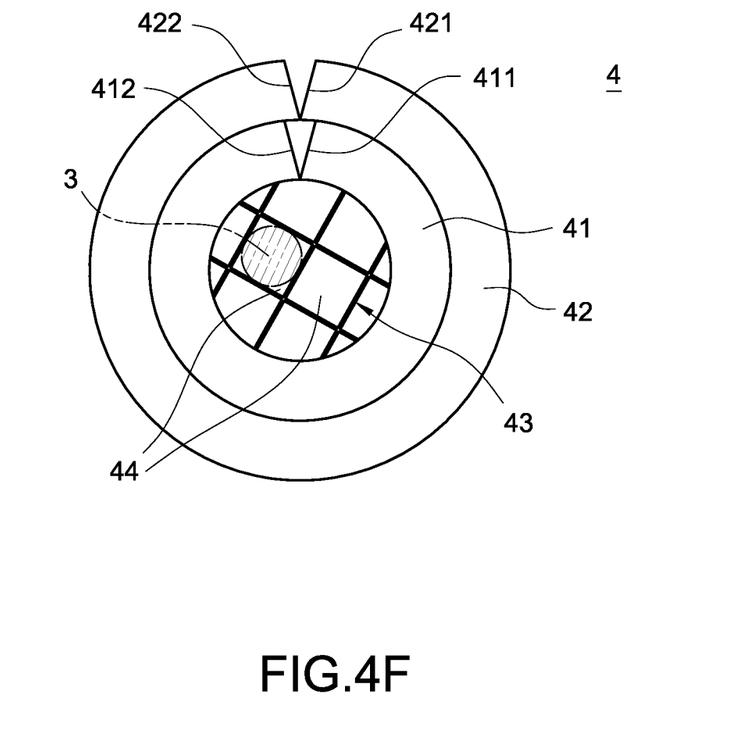
FIG. 4F is a schematic diagram of a sixth printing action of an embodiment according to the present disclosure.

As shown in FIG. 4F, for reaching the purposes of enhancing the strength of the 3D model and reducing the material usage at the same time, the 3D printer in the related art usually adopts a honeycomb structure 43 as an internal structure inside the 3D model. In this embodiment, the 3D printer mainly controls the nozzle 3 to move inwardly from the exterior-contour 42 to any gap 44 of the honeycomb structure 43 (i.e., any gap 44 inside the 3D model), so as to prevent the above mentioned drooling events from occurring at the internal-contour 41, the exterior-contour 42 or the honeycomb structure 43.

In the exemplary embodiments of the present disclosure, the 3D printer controls the nozzle 3 to move inwardly and away from the exterior-contour 42 for the threshold range at first, and then changes the related position between the nozzle 3 and the printing platform 31 upon the z-axis. In the embodiment shown in FIG. 4E, the 3D printer controls the nozzle 3 to move according to the Z-axis, so as to raise the nozzle 3 to a printing position corresponding to the next printing-layer 4 from the position which is away from the exterior-contour 42 of the last printing-layer 4 (i.e., changes the height of the nozzle 3 at the Z-axis to a printing height corresponding to the next printing-layer 4).

Figure 4G:
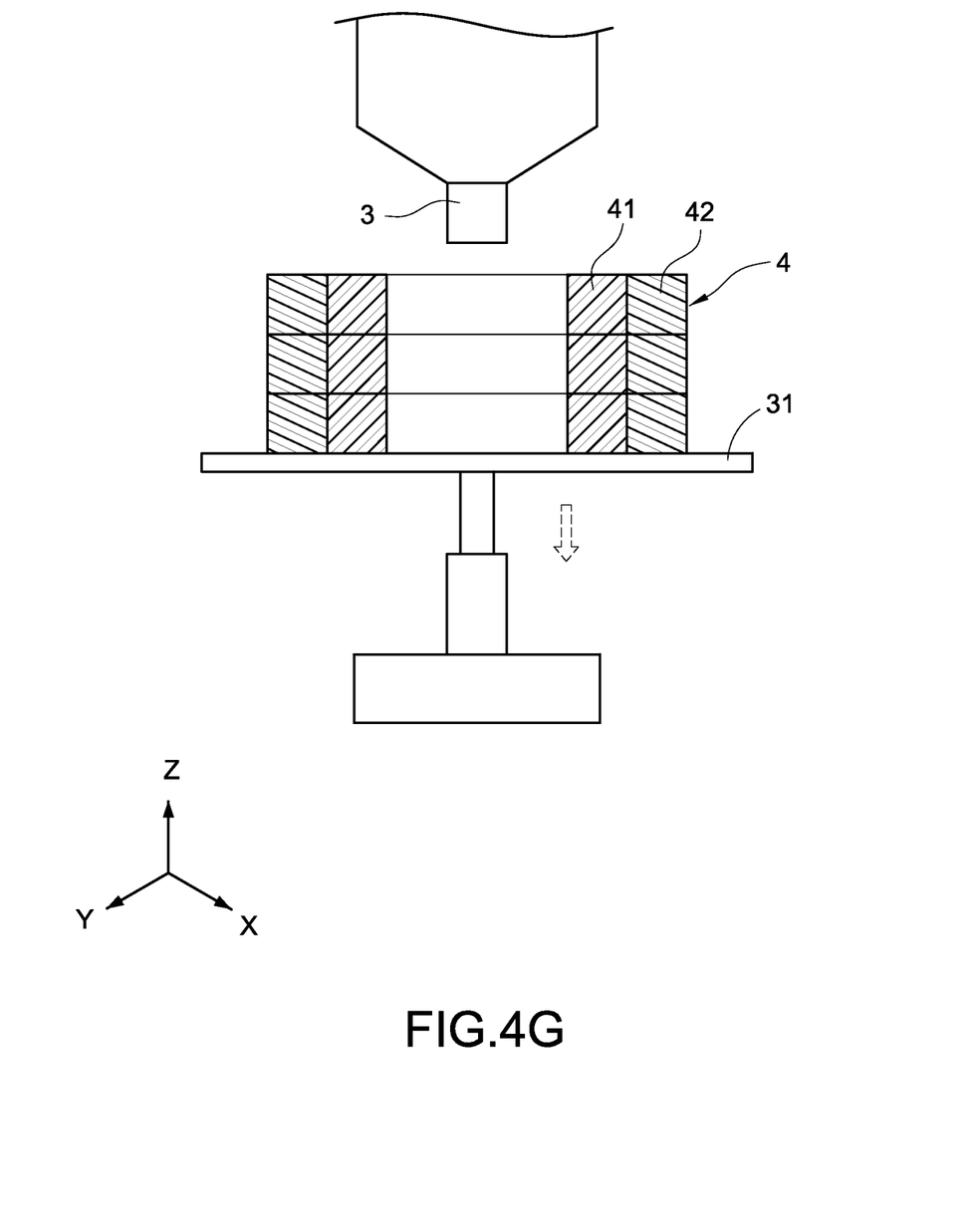
FIG. 4G is a schematic diagram of a seventh printing action of an embodiment according to the present disclosure.

In the embodiment shown in FIG. 4G, when changing the related position between the nozzle 3 and the printing platform 31 upon the z-axis, the 3D printer can also choose to control the printing platform 31 to move according to the Z-axis, so as to place the nozzle 3 to the printing position corresponding to the next printing-layer 4 (i.e., changes the height of the printing platform 31 at the Z-axis, so as to move the next printing-layer 4 to the height the nozzle 3 located).

Although the low melting-point material won't be solidified immediately after being printed, the printing method in the present disclosure can prevent the exterior-contour of the 3D model from being deformed by the nozzle before the exterior-contour is solidified completely. Besides, the printing method of the present disclosure controls the nozzle to move immediately and inwardly after the exterior-contour is printed completely, and change the height of the nozzle or the printing platform at the Z-axis after the nozzle is controlled to move inwardly and away from the exterior-contour for the threshold range, so it can effectively prevent the drooling events from occurring at the exterior-contour and affecting the appearance of the 3D model.

As the skilled person will appreciate, various changes and modifications can be made to the described embodiment. It is intended to include all such variations, modifications and equivalents which fall within the scope of the present invention, as defined in the accompanying claims.

What is claimed is:

1. A printing method for low melting-point material, used by a 3D printer having a nozzle and a printing platform, the printing method comprising:
   a) controlling the nozzle to move to a first printing position upon the printing platform corresponding to an internal-contour of a printing-layer;
   b) after the step a, controlling the nozzle to start printing the internal-contour;
   c) controlling the nozzle to stop printing after the internal-contour is printed completely, and controlling the stopped nozzle to move to a second printing position upon the printing platform corresponding to an exterior-contour of the printing-layer; and
   d) controlling the stopped nozzle to start printing the exterior-contour after the step c;
   e) controlling the nozzle to stop printing after the exterior-contour is printed completely;
   f) controlling the stopped nozzle to move inwardly from the exterior-contour toward a space not upon the printing-layer and away from the exterior-contour by a threshold range after the step e; and
   g) changing a related position between the nozzle and the printing platform upon a Z-axis.

2. The printing method in claim 1, wherein the step f is to control the nozzle to move from the exterior-contour to a center position of the 3D model.

3. The printing method in claim 1, wherein the step f is to control the nozzle to move from the exterior-contour to any gap inside the 3D model.

4. The printing method in claim 1, wherein the 3D printer prints a 3D model constructed by multiple of the printing-layers, and the printing method further comprises following steps: h) determining if the 3D model is printed completely; and i) re-executing the step a to the step g before the 3D model is printed completely.

5. The printing method in claim 4, wherein the step g is to control the nozzle or the printing platform to move according to the Z-axis and place the nozzle to a third printing position corresponding to the next printing-layer of the 3D model.

6. The printing method in claim 4, wherein the step f is to control the nozzle to mow from the exterior-contour to a center position of the 3D model.

7. The printing method in claim 5, wherein the step f is to control the nozzle to mow from the exterior-contour to a center position of the 3D model.

8. The printing method in claim 4, wherein the step f is to control the nozzle to move from the exterior-contour to any gap inside the 3D model.

9. The printing method in claim 5, wherein the step f is to control the nozzle to mow from the exterior-contour to any gap inside the 3D model.

10. A printing method for low melting-point material, used by a 3D printer having a nozzle and a printing platform, the printing method comprising:
   a) controlling the nozzle to move to a first starting position upon the printing platform corresponding to an internal-contour of a printing-layer;
   b) controlling the nozzle to start printing the internal-contour from the first starting position after the step a;
   c) controlling the nozzle to stop printing after the internal-contour is printed completely, and controlling the stopped nozzle to move to a second starting position upon the printing platform corresponding to an exterior-contour of the printing-layer from a first ending position of the internal-contour;
   d) controlling the stopped nozzle to start printing the exterior-contour from the second starting position after the step c;
   e) controlling the nozzle to stop printing after the exterior-contour is printed completely;
   f) controlling the stopped nozzle to move inwardly from a second ending position of the exterior-contour toward a space not upon the printing-layer and away from the exterior-contour by a threshold range after the step e;
   g) changing a height of the nozzle or the printing platform at a Z-axis after the step f to place the nozzle to a printing height corresponding to the next printing-layer; and
   h) re-executing the step a to the step g before a 3D model is printed completely, wherein the 3D model is constructed by multiple of the printing-layers.

11. The printing method in claim 10, wherein the step f is to control the nozzle to mow from the second ending position of the exterior-contour to a center position of the 3D model.

12. The printing method in claim 10, wherein the step f is to control the nozzle to move from the second ending position of the exterior-contour to any gap inside the 3D model.

* * * * *